United States Patent Office 3,826,843
Patented July 30, 1974

3,826,843
1-SUBSTITUTED BIGUANIDES AS GASTRO-
INTESTINAL SPASMOLYTIC AGENTS
Julius Diamond, 120 Red Rambler Drive, Lafayette Hill,
Pa. 19444; George H. Douglas, 21 Manor Road,
Paoli, Pa. 19301; and Bernard J. Burns, 2171 Disston
St., Philadelphia, Pa. 19149
No Drawing. Continuation-in-part of abandoned application Ser. No. 89,005, Nov. 12, 1970. This application
Oct. 14, 1971, Ser. No. 189,388
Int. Cl. A61k 27/00
U.S. Cl. 424—326                            21 Claims

ABSTRACT OF THE DISCLOSURE

The 1-substituted phenyl biguanide compounds of this invention possess useful gastric anti-secretory and spasmolytic properties. Compounds of this type which also display anti-hypertensive and CNS depressant properties are also disclosed.

CROSS REFERENCE TO RELATED APPLICATIONS

This is a continuation-in-part application based on co-pending U.S. Ser. No. 89,005, filed Nov. 12, 1970, now abandoned.

SUMMARY OF THE INVENTION

This invention describes new 1-substituted phenyl biguanide compounds and processes for their preparation. This invention further provides valuable pharmaceutical preparations which contain 1-substituted phenyl biguanide compounds as active gastric antisecretory and spasmolytic agents. A method for the treatment of gastrointestinal disorders and diseases is also described. The compounds of this invention also possess an effective degree of antihypertensive and CNS depressant activity.

BACKGROUND OF THE INVENTION

The pharmaceutical compositions which have been used as gastric antisecretory and spasmolytic agents have been such as atropine, homatropine, propantheline bromide, dicyclomine hydrochloride and other compounds which are structurally dissimilar to the biguanides of this invention. Due to the anticholinergic properties of these compounds they are known to produce undesirable side effects such as mydriasis, xerostomia, cyclopegia and other unwanted effects.

There have been a number of 1-aryl biguanides described in the literature. They have been proposed for use as antidiabetics, anorexigenic or antimalarial agents. J. H. Burn and J. R. Vane, however, in the Brit. J. Pharmacol. (1948), 3:346–9 tested 1-(p-chlorophenyl)biguanide for its ability to reduce gastric secretion. Their findings determined that little or no reduction of gastric secretion was associated with this compound. Contrary to this belief:

We have unexpectedly found that di- and trihalophenyl biguanide compounds unexpectedly exhibit valuable pharmacologic properties and are useful gastric antisecretory and spasmolytic agents.

We have also found that the compounds of this invention are substantially free of the anticholinergic side-effects which accompany gastric antisecretory and spasmolytic agents.

We have further found that the compounds of this invention have a low order of toxicity.

We have still further found a simple and effective method for treating gastrointestinal disorders and diseases, such as duodenal and peptic ulcers.

We have found that the 1-halo phenyl biguanides of this invention also have an effective degree of antihypertensive and CNS depressant activity.

DESCRIPTION AND PREFERRED EMBODIMENT

This invention describes a class of novel chemical compounds which comprise a phenyl ring which is substituted with at least two halo groups. This substituted phenyl radical is further attached to a biguanide chain at the 1-position. This invention also describes the non-toxic pharmaceutically acceptable salts and the method of preparing these 1-substituted biguanide compounds.

The compounds of this invention are described by the structural formula I

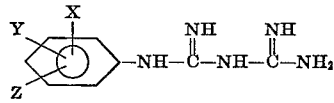

where:

X, Y and Z may be at any position on the ring;
X and Y are fluoro, chloro, bromo or iodo; and
Z is hydrogen, fluoro, chloro, bromo or iodo;
with the provision that X or Y is other than 2-bromo when the remaining Y or X is 4-chloro or 4-bromo while Z is hydrogen; and, when X and Y are both chloro and in other than the 2- and 6-positions then Z is other than hydrogen and when X, Y and Z are all chloro and X and Y are in the 3- and 4-positions then Z is in the 2-position;

and their non-toxic acid addition salts.

The more preferred compounds of this invention are described by structural formula I where:

X and Y are fluoro, chloro or bromo and
Z is hydrogen, fluoro, chloro or bromo.

The most preferred compounds of this invention are described by structural formula I where:

X and Y are chloro or bromo and
Z is hydrogen, fluoro, chloro or bromo;

and their non-toxic acid addition salts.

This invention further describes a new method of treating gastrointestinal disorders and diseases which comprises the administration of the 1-halo phenyl biguanide compounds of structural formula I where:

X and Y are fluoro, chloro, bromo or iodo; and
Z is hydrogen, fluoro, chloro, bromo, or iodo;

and their non-toxic acid addition salts.

This invention still further describes a new method in the treatment of hypertensive disorders by the administration of a therapeutically effective amount of the 1-halo phenyl biguanide compounds of structural formula I.

It is well known in the pharmacological arts that non-toxic acid addition salts of pharmacologically active amine compounds do not differ in activities from their free base. The salts merely provide a convenient solubility factor.

The amines of this invention may be readily converted to their non-toxic acid addition salts by customary methods in the art. The non-toxic salts of this invention are those salts the acid component of which is pharmacologically acceptable in the intended dosages; such salts would include those prepared from inorganic acids, organic acids, higher fatty acids, high molecular weight acids, etc. and include such as:

| | |
|---|---|
| hydrochloric acid, | succinic acid, |
| hydrobromic acid, | glycolic acid, |
| sulfuric acid, | lactic acid, |
| nitric acid, | salicylic acid, |
| phosphoric acid, | benzoic acid, |
| methane sulfonic acid, | nicotinic acid, |
| benzene sulfonic acid, | phthalic acid, |
| acetic acid, | stearic acid, |
| propionic acid, | oleic acid, |
| malic acid, | abietic acid, etc. |

Representative compounds of this invention which are particularly useful are as follows:

1-(2,3-dichlorophenyl)biguanide
1-(2,4-dichlorophenyl)biguanide
1-(2,5-dichlorophenyl)biguanide
1-(2,6-dichlorophenyl)biguanide
1-(3,4-dichlorophenyl)biguanide
1-(3,5-dichlorophenyl)biguanide
1-(2,3,4-trichlorophenyl)biguanide
1-(2,3,5-trichlorophenyl)biguanide
1-(2,3,6-trichlorophenyl)biguanide
1-(2,4,5-trichlorophenyl)biguanide
1-(2,4,6-trichlorophenyl)biguanide
1-(2,3-dibromophenyl)biguanide
1-(2,4-dibromophenyl)biguanide
1-(2,5-dibromophenyl)biguanide
1-(2,6-dibromophenyl)biguanide
1-(3,4-dibromophenyl)biguanide
1-(3,5-dibromophenyl)biguanide
1-(2,3,4-tribromophenyl)biguanide
1-(2,3,5-tribromophenyl)biguanide
1-(2,3,6-tribromophenyl)biguanide
1-(2,4,5-tribromophenyl)biguanide
1-(2,4,6-tribromophenyl)biguanide
1-(3,4,5-tribromophenyl)biguanide
1-(2-chloro-3-bromophenyl)biguanide
1-(2-chloro-4-bromophenyl)biguanide
1-(2-chloro-5-bromophenyl)biguanide
1-(2-chloro-6-bromophenyl)biguanide
1-(3-chloro-2-bromophenyl)biguanide
1-(3-chloro-4-bromophenyl)biguanide
1-(3-chloro-5-bromophenyl)biguanide
1-(3-chloro-6-bromophenyl)biguanide
1-(4-chloro-2-bromophenyl)biguanide
1-(4-chloro-3-bromophenyl)biguanide
1-(2-fluoro-4-chlorophenyl)biguanide
1-(2-fluoro-6-chlorophenyl)biguanide
1-(2-chloro-4-fluorophenyl)biguanide
1-(2-chloro-4-bromophenyl)biguanide
1-(2-fluoro-4-bromophenyl)biguanide
1-(2-fluoro-6-bromophenyl)biguanide
1-(2-bromo-4-fluorophenyl)biguanide
1-(2-iodo-4-chlorophenyl)biguanide
1-(2-iodo-6-chlorophenyl)biguanide
1-(2-chloro-4-iodophenyl)biguanide
1-(2-iodo-4-bromophenyl)biguanide
1-(2,4-difluorophenyl)biguanide
1-(2,5-difluorophenyl)biguanide
1-(2,6-difluorophenyl)biguanide
1-(2,4-diiodophenyl)biguanide
1-(2-iodo-6-bromophenyl)biguanide
1-(2-bromo-4-iodophenyl)biguanide
1-(2-fluoro-4-iodophenyl)biguanide
1-(2-iodo-4-fluorophenyl)biguanide
1-(2,4-dichloro-6-bromophenyl)biguanide
1-(2,6-dichloro-4-bromophenyl)biguanide
1-(2,4-dibromo-6-chlorophenyl)biguanide
1-(2,6-dibromo-4-chlorophenyl)biguanide
1-(2,4-dichloro-6-fluorophenyl)biguanide
1-(2,6-dichloro-4-fluorophenyl)biguanide
1-(2,5-dichloro-4-fluorophenyl)biguanide
1-(2,4-dichloro-6-iodophenyl)biguanide
1-(2,6-dichloro-4-iodophenyl)biguanide
1-(2,4-dibromo-6-iodophenyl)biguanide
1-(2,6-dibromo-4-iodophenyl)biguanide
1-(2,4-dibromo-6-fluorophenyl)biguanide
1-(2,6-dibromo-4-fluorophenyl)biguanide
1-(2-chloro-4-bromo-6-fluorophenyl)biguanide
1-(2-bromo-4-fluoro-6-chlorophenyl)biguanide
1(2-bromo-4-chloro-6-fluorophenyl)biguanide
1-(2-chloro-4-iodo-6-bromophenyl)biguanide
1-(2,4,6-trifluorophenyl)biguanide The compounds of this invention may be prepared by the following general procedures:

Condensation of cyanoguanide and a substituted aniline in the presence of an equimolar amount of a mineral acid results in the corresponding substituted phenylbiguanide.

The following reaction equation illustrates this synthesis:

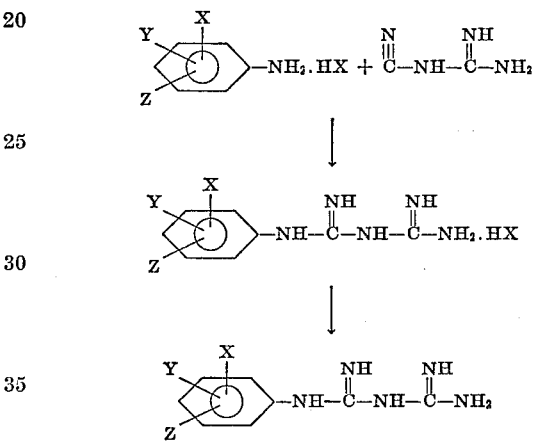

where: HX is a mineral acid.

The reaction is preferably carried out on the aniline salt either in a polar medium or neat and using increased temperatures. The salt used may be any acid addition amine salt but preferably the salt of a mineral acid. The polar medium may be aqueous, partially aqueous or a non-aqueous solution. It is convenient to choose a solvent that will reflux at the desired reaction temperature. The more preferred solvents are water or alcohol but other solvents may be used such as DMSO, diethyleneglycol, ethyleneglycol, tetrahydrofuran, dimethylformamide, etc. The reaction should also be carried out at a temperature which is high enough so that condensation takes place readily, but not sufficient to decompose the biguanide formed. The reaction temperature can vary from room temperature to about 250° C. although it is preferable to run the reaction at temperatures from about 50° C. to 150° C. The biguanide salt which is formed can be converted to the free base with a metal hydroxide or alkoxide solution. The isolation of the desired biguanide can be carried out by any method known in the art.

The starting anilines are either known or may be prepared by known halogenation techniques. Thus, chlorination, bromination or iodination on an acetanilide or aniline may be carried out in acetic acid, or in the presence of a small amount of iodine dissolved in an inert solvent such as carbon tetrachloride. A solution of chlorine, bromine or iodine monochloride is then added while the temperature is held near 0° C. This results in substitution in the ortho and para positions. Halogenation followed by a second halogenation results in the desired mixed halo anilides. Further halogenation results in the desired polysubstituted anilides. Deacylation with 50% sulfuric acid or alcoholic potassium hydroxide results in the aniline.

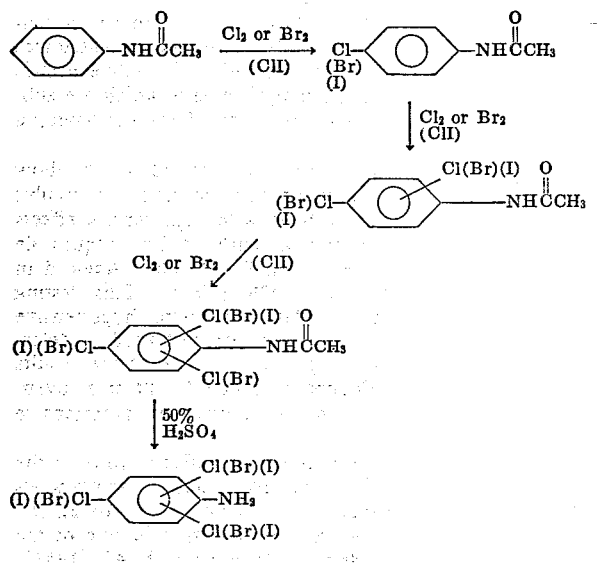

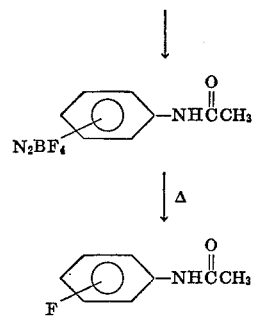

When halogenation is carried out as above on acetophenone or an ortho or para halo substituted acetophenone in place of anilide, then substitution takes place in the meta position. Formation of a oxime followed by Beckmann Rearrangement results in the acetamide which is then deacylated to the aniline.

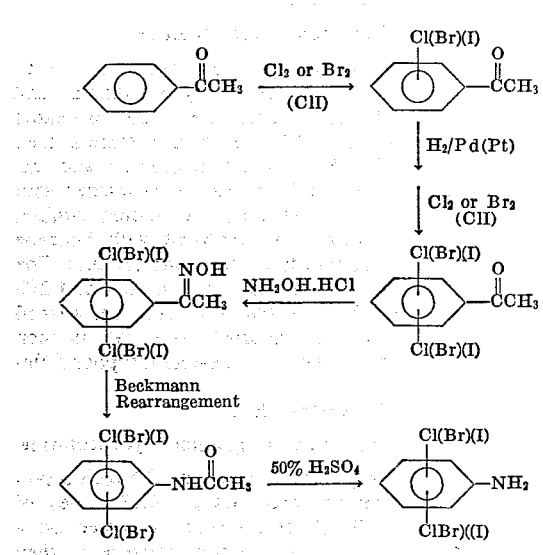

Nitration of the above anilides followed by reduction to the amine which is then diazotized to the diazonium fluoroborate and thermally decomposed results in the fluoroanilide. Diazotization followed by a Sandmeyer type reaction with cuprous chloride, cuprous bromide or cuprous iodide results in the haloanilide.

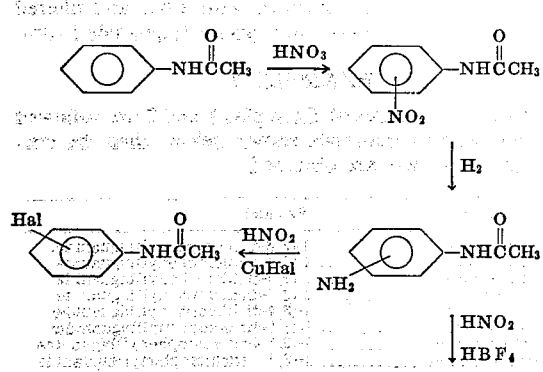

Reactions can also be carried out on 1-phenyl or halophenyl biguanide compounds which result in further substituted products. In this regard, we have found that 1-halophenylbiguanides may be further halogenated to obtain polyhalo substituted products.

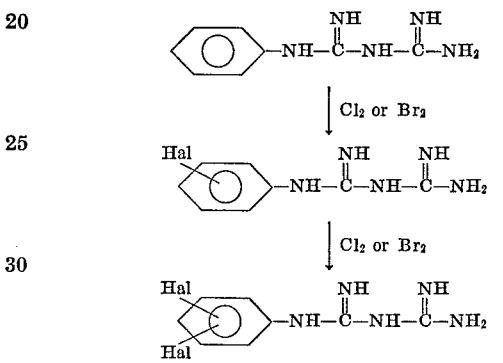

A special embodiment of this invention describes a novel process for preparing the instant biguanide compounds. We have unexpectedly found that when the reaction of the substituted aniline with cyanoguanidine takes place in a mildly acidic solvent which is non-nucleophilic then the condensation takes place in high yield. We have further found that this reaction works on highly hindered as well as highly unreactive anilines. It is preferable to use a phenolic solvent such as a phenol, cresol, xylol, etc. The reaction can be carried out at temperatures from room temperature to about 150° C.; however, it is preferable to use temperatures between 60–100° C. Isolation of the reaction product can be carried out by chemical or physical techniques; however, it is convenient to precipitate the salt of the product out of the reaction mixture with a nonpolar solvent such as ether or by making the reaction mixture alkaline and extracting with ether.

The compounds of this invention have a useful degree of gastric anti-secretory activity and are effective in reducing the volume and the acidity of the gastric fluid in humans and mammals. Further, these compounds produce a considerable spasmolytic action on the gastrointestinal musculature, i.e., they reduce the peristaltic action of the gastrointestinal musculature which is manifested by a delay in gastic emptying time. It should further be noted that these compounds are also characterized by their low acute oral toxicity.

In particular the 1-halophenyl biguanides as herein described are useful in the treatment of such gastrointestinal disorders and diseases as duodenal ulcer and peptic ulcer.

The instant compounds may be used alone or in combination with other known antacids such as aluminum hydroxide, magnesium hydroxide, magnesium trisilicate, aluminum glycinate, calcium carbonate and the like.

The compounds of this invention possess blood-pressure lowering effects and are therefore also useful as antihypertensive agents.

For these purposes, the biguanides of this invention can be normally administered orally or parenterally. Orally they may be administered as tablets, aqueous or oily suspensions, dispersible powders or granules, emulsions, hard or soft capsules, or syrups or elixirs.

Compositions intended for oral use may be prepared according to any method known to the art for the manufacture of pharmaceutical compositions and such compositions may contain one or more agents selected from the group consisting of sweetening agents, flavoring agents, coloring agents, preserving agents and the like, in order to provide a pharmaceutically elegant and palatable preparation.

The dosage regimen in carrying out the methods of this invention is that which insures maximum therapeutic response until improvement is obtained and thereafter the minimum effective level which gives relief. Thus, in general, the dosages are those that are therapeutically effective in the treatment of gastrointestinal disease conditions or symptoms, such as duodenal and peptic ulcer, and in the alleviation of hypertensive disorders. In general, the daily dose can be between about 0.05 mg./kg. and 70 mg./kg. (preferably in the range of 2–25 mg./kg./day), bearing in mind, of course, that in selecting the appropriate dosage in any specific case, consideration must be given to the patient's weight, general health, age, and other factors which may influence response to the drug.

Various tests in animals have been carried out to show the ability of the compounds of this invention to exhibit reactions that can be correlated with activity in humans. These tests involve such factors as the effect of the 1-halo phenylbiguanides on gastric secretion, their spasmolytic effect, their mydriatic effect and determination of their toxicity. It has been found that the compounds of this invention when tested in the above variety in situations show a marked activity.

One such test is the gastric secretion test. This test is carried out as follows: Shay rats are fasted for 4–8 hours, and water is given *ad lib*. The rats are selected at random and separated into groups of 10. The animals are treated intraduodenally (I.D.) with the test compound or the vehicle immediately subsequent to the ligation of the stomach at the pyloric sphincter. The animals are sacrificed with chloroform at 4 hours post-drug administration, the stomach is removed and its contents are assayed for volume, pH and total acids.

A second gastric secretion test is carried out on the dog. This is outlined in the *Handbook of Physiology*, Section 6: Alimentary Canal, Volume II: Secretion. American Physiology Society, Washington, D.C., 1967.

It has been found that the compounds of this invention when subjected to the above gastric secretion tests display marked ability to decrease gastric volume and gastric acidity. These tests are known to correlate well with gastric activity in humans and are standard tests used to determine anti-secretory properties.

To determine the anti-ulcer effectiveness the following test may be employed: Male Wistar rats (130–150 grams) are fasted for 24 hours, then given reserpine at 5 mg./kg. i.p. Twenty-four hours later, the stomachs are removed and examined for ulceration. Ulcers are graded on a 0–4 scale and the number of ulcers is recorded. Pretreatment with the halophenyl biguanide compounds produces a decrease in ulcer grade and the number of ulcers compared to the control reserpine-treated rats.

Determination of anti-spasmolytic properties can be carried out by the procedure as outlined by D. A. Brodie and S. K. Kundrats in their article entitled "Effect of Drugs on Gastric Emptying in Rats," *Fed. Proc.* 24:714 (1965).

Mydriasis is detected by the procedure of R. A. Turner, *Screening Methods in Pharmacology*, Academic Press, New York, and London, pp. 174–5, 1965. Acute toxicity is calculated according to the standard Litchfield-Wilcoxon procedure.

In view of the results of these tests, the pharmacological data clearly indicates that the 1-halophenyl biguanides of this invention can be considered to be active gastric anti-secretory and anti-spasmolytic agents which are substantially free of anti-cholinergic side effects and having a low toxicity.

Tests in animals have also been carried out to show the ability of compounds of this invention to inhibit reactions that can be correlated with hypertensive effects in humans. One such test is outlined by Jacques de Champlain, Lawrence R. Krahoff and Julius Axelrod in *Circulation Research* XXIII:479 (1968). This testing method is known to correlate well with hypertensive activity in humans and is a standard test used to determine anti-hypertensive properties. In view of the results of this test, the 1-halophenyl biguanides of this invention can be considered to be active anti-hypertensive agents.

To determine the CNS depressant effectiveness of the compounds of Formula I, the suppression of spontaneous motor activity is evaluated in normal mice (18–22 g.) and immature rats (90–100 g.) by a modification of the Dew method: Dews, *Brit. J. Pharmacol*: 8, 46 (1953). Results of this test indicate that a relative increase in depressant activity is evident.

The following are detailed examples which show the preparation of the compounds of this invention. They are to be construed as illustrations of said compounds and not as limitations thereof.

EXAMPLE 1

1-(2,6-Dichlorophenyl)biguanide

A stirred mixture of 300 g. (1.85 mole) of 2,6-dichloroaniline, 155 g. (1.25 mole) of cyanoguandine and 712 ml. of 2.6 N hydrochloric acid (1.85 mole) is heated at 60° C. for several hours. The reaction mixture is then cooled, basified with 40% sodium hydroxide and extracted with 1:1 ether-ethanol. The extract is washed with a saturated saline solution and dried over sodium sulfate. The solvent is evaporated and replaced with benzene which on concentrating results in the crude product. The residue is dissolved in 100 ml. of hot methanol and 200 ml. of water is added. The precipitate is removed, washed with water and dried. The hydrochloride salt is then made in alcohol to obtain 1-(2,6-dichlorophenyl)biguanide.

EXAMPLE 2

1-(2,5-Dichloro-4-fluorophenyl)biguanide hydrochloride

A mixture of 47.9 g. (0.22 mole) of 2,5-dichloro-4-fluoroaniline hydrochloride and 19.4 g. (0.23 mole) of cyanoguanidine in 300 ml. of m-cresol is heated on a steam bath for 1 hour. The reaction mixture is then cooled and ether added to obtain a precipitate. This is filtered off and dissolved in warm water, charcoaled and filtered and cooled in an ice bath. 10% sodium hydroxide solution is then added to make the mixture strongly basic. The mixture is then filtered and washed with water. This is then dissolved in methanol, the pH is adjusted to 7 with methanolic hydrochloric acid and the mixture evaporated to dryness, triturated with ether and filtered to obtain 1-(2,5-dichloro-4-fluorophenyl)biguanide hydrochloride.

EXAMPLE 3

When the procedures of Examples 1 and 2 are followed using the starting materials shown below, then the corresponding products are obtained.

| Starting material | Product |
|---|---|
| 2,3-dichloroaniline | 1-(2,3-dichlorophenyl)biguanide. |
| 2,4-dichloroaniline | 1-(2,4-dichlorophenyl)biguanide. |
| 2,5-dichloroaniline | 1-(2,5-dichlorophenyl)biguanide. |
| 2,6-dichloroaniline | 1-(2,6-dichlorophenyl)biguanide. |
| 3,4-dichloroaniline | 1-(3,4-dichlorophenyl)biguanide. |
| 3,5-dichloroaniline | 1-(3,5-dichlorophenyl)biguanide. |
| 2,3,4-trichloroaniline | 1-(2,3,4-trichlorophenyl)biguanide. |
| 2,3,5-trichloroaniline | 1-(2,3,5-trichlorophenyl)biguanide. |

TABLE—Continued

| Starting material | Product |
| --- | --- |
| 2,3,6-trichloroaniline | 1-(2,3,6-trichlorophenyl)biguanide. |
| 2,4,5-trichloroaniline | 1-(2,4,5-trichlorophenyl)biguanide. |
| 2,4,6-trichloroaniline | 1-(2,4,6-trichlorophenyl)biguanide. |
| 3,4,5-trichloroaniline | 1-(3,4,5-trichlorophenyl)biguanide. |
| 2,3-dibromoaniline | 1-(2,3-dibromophenyl)biguanide. |
| 2,4-dibromoaniline | 1-(2,4-dibromophenyl)biguanide. |
| 2,5-dibromoaniline | 1-(2,5-dibromophenyl)biguanide. |
| 2,6-dibromoaniline | 1-(2,6-dibromophenyl)biguanide. |
| 3,4-dibromoaniline | 1-(3,4-dibromophenyl)biguanide. |
| 3,5-dibromoaniline | 1-(3,5-dibromophenyl)biguanide. |
| 2,3,4-tribromoaniline | 1-(2,3,4-tribromophenyl)biguanide. |
| 2,3,5-tribromoaniline | 1-(2,3,5-tribromophenyl)biguanide. |
| 2,3,6-tribromoaniline | 1-(2,3,6-tribromophenyl)biguanide. |
| 2,4,5-tribromoaniline | 1-(2,4,5-tribromophenyl)biguanide. |
| 2,4,6-tribromoaniline | 1-(2,4,6-tribromophenyl)biguanide. |
| 3,4,5-tribromoaniline | 1-(3,4,5-tribromophenyl)biguanide. |
| 2-chloro-3-bromoaniline | 1-(2-chloro-3-bromophenyl)biguanide. |
| 2-chloro-4-bromoaniline | 1-(2-chloro-4-bromophenyl)biguanide. |
| 2-chloro-5-bromoaniline | 1-(2-chloro-5-bromophenyl)biguanide. |
| 2-chloro-6-bromoaniline | 1-(2-chloro-6-bromophenyl)biguanide. |
| 3-chloro-2-bromoaniline | 1-(3-chloro-2-bromophenyl)biguanide. |
| 3-chloro-4-bromoaniline | 1-(3-chloro-4-bromophenyl)biguanide. |
| 3-chloro-5-bromoaniline | 1-(3-chloro-5-bromophenyl)biguanide. |
| 3-chloro-6-bromoaniline | 1-(3-chloro-6-bromophenyl)biguanide. |
| 4-chloro-2-bromoaniline | 1-(4-chloro-2-bromophenyl)biguanide. |
| 4-chloro-3-bromoaniline | 1-(4-chloro-3-bromophenyl)biguanide. |
| 2-chloro-3-iodoaniline | 1-(2-chloro-3-iodophenyl)biguanide. |
| 2-chloro-4-iodoaniline | 1-(2-chloro-4-iodophenyl)biguanide. |
| 2-chloro-5-iodoaniline | 1-(2-chloro-5-iodophenyl)biguanide. |
| 2-chloro-6-iodoaniline | 1-(2-chloro-6-iodophenyl)biguanide. |
| 3-chloro-2-iodoaniline | 1-(3-chloro-2-iodophenyl)biguanide. |
| 3-chloro-4-iodoaniline | 1-(3-chloro-4-iodophenyl)biguanide. |
| 3-chloro-5-iodoaniline | 1-(3-chloro-5-iodophenyl)biguanide. |
| 3-chloro-6-iodoaniline | 1-(3-chloro-6-iodophenyl)biguanide. |
| 4-chloro-2-iodoaniline | 1-(4-chloro-2-iodophenyl)biguanide. |
| 4-chloro-3-iodoaniline | 1-(4-chloro-3-iodophenyl)biguanide. |
| 2-chloro-3-fluoroaniline | 1-(2-chloro-3-fluorophenyl)biguanide. |
| 2-chloro-4-fluoroaniline | 1-(2-chloro-4-fluorophenyl)biguanide. |
| 2-chloro-5-fluoroaniline | 1-(2-chloro-5-fluorophenyl)biguanide. |
| 2-chloro-6-fluoroaniline | 1-(2-chloro-6-fluorophenyl)biguanide. |
| 3-chloro-2-fluoroaniline | 1-(3-chloro-2-fluorophenyl)biguanide. |
| 3-chloro-4-fluoroaniline | 1-(3-chloro-4-fluorophenyl)biguanide. |
| 3-chloro-5-fluoroaniline | 1-(3-chloro-5-fluorophenyl)biguanide. |
| 3-chloro-6-fluoroaniline | 1-(3-chloro-6-fluorophenyl)biguanide. |
| 4-chloro-2-fluoroaniline | 1-(4-chloro-2-fluorophenyl)biguanide. |
| 4-chloro-3-fluoroaniline | 1-(4-chloro-3-fluorophenyl)biguanide. |
| 2,3-dichloro-4-bromoaniline | 1-(2,3-dichloro-4-bromophenyl)biguanide. |
| 2,4-dichloro-3-bromoaniline | 1-(2,4-dichloro-3-bromophenyl)biguanide. |
| 3,4-dichloro-2-bromoaniline | 1-(3,4-dichloro-2-bromophenyl)biguanide. |
| 2,3-dibromo-4-chloroaniline | 1-(2,3-dibromo-4-chlorophenyl)biguanide. |
| 2,4-dibromo-3-chloroaniline | 1-(2,4-dibromo-3-chlorophenyl)biguanide. |
| 3,4-dibromo-2-chloroaniline | 1-(3,4-dibromo-2-chlorophenyl)biguanide. |
| 2,3-dichloro-4-fluoroaniline | 1-(2,3-dichloro-4-fluorophenyl)biguanide. |
| 2,4-dichloro-3-fluoroaniline | 1-(2,4-dichloro-3-fluorophenyl)biguanide. |
| 3,4-dichloro-2-fluoroaniline | 1-(3,4-dichloro-2-fluorophenyl)biguanide. |
| 2,3-difluoro-4-chloroaniline | 1-(2,3-difluoro-4-chlorophenyl)biguanide. |
| 2,4-difluoro-3-chloroaniline | 1-(2,4-difluoro-3-chlorophenyl)biguanide. |
| 3,4-difluoro-2-chloroaniline | 1-(3,4-difluoro-2-chlorophenyl)biguanide. |
| 2,3-chloro-4-iodoaniline | 1-(2,3-dichloro-4-iodophenyl)biguanide. |
| 2,4-dichloro-3-iodoaniline | 1-(2,4-dichloro-3-iodophenyl)biguanide. |
| 3,4-dichloro-2-iodoaniline | 1-(3,4-dichloro-2-iodophenyl)biguanide. |
| 2,3-diiodo-4-chloroaniline | 1-(2,3-diiodo-4-chlorophenyl)biguanide. |
| 2,4-diiodo-3-chloroaniline | 1-(2,4-diiodo-3-chlorophenyl)biguanide. |
| 3,4-diiodo-2-chloroaniline | 1-(3,4-diiodo-2-chlorophenyl)biguanide. |
| 2,3-dibromo-4-fluoroaniline | 1-(2,3-dibromo-4-fluorophenyl)biguanide. |
| 2,4-dibromo-3-fluoroaniline | 1-(2,4-dibromo-3-fluorophenyl)biguanide. |
| 3,4-dibromo-2-fluoroaniline | 1-(3,4-dibromo-2-fluorophenyl)biguanide. |
| 2,3-difluoro-4-bromoaniline | 1-(2,3-difluoro-4-bromophenyl)biguanide. |
| 2,4-difluoro-3-bromoaniline | 1-(2,4-difluoro-3-bromophenyl)biguanide. |
| 3,4-difluoro-2-bromoaniline | 1-(3,4-difluoro-2-bromophenyl)biguanide. |
| 2,3-dibromo-4-iodoaniline | 1-(2,3-dibromo-4-iodophenyl)biguanide. |
| 2,4-dibromo-3-iodoaniline | 1-(2,4-dibromo-3-iodophenyl)biguanide. |
| 3,4-dibromo-2-iodoaniline | 1-(3,4-dibromo-2-iodophenyl)biguanide. |
| 2,3-diiodo-4-bromoaniline | 1-(2,3-diiodo-4-bromophenyl)biguanide. |
| 2,4-diiodo-3-bromoaniline | 1-(2,4-diiodo-3-bromophenyl)biguanide. |
| 3,4-diiodo-2-bromoaniline | 1-(3,4-diiodo-2-bromophenyl)biguanide. |
| 2,3-difluoro-4-iodoaniline | 1-(2,3-difluoro-4-iodophenyl)biguanide. |
| 2,4-difluoro-3-iodoaniline | 1-(2,4-difluoro-3-iodophenyl)biguanide. |
| 3,4-difluoro-2-iodoaniline | 1-(3,4-difluoro-2-iodophenyl)biguanide. |
| 2,3-diiodo-4-fluoroaniline | 1-(2,3-diiodo-4-fluorophenyl)biguanide. |
| 2,4-diiodo-3-fluoroaniline | 1-(2,4-diiodo-3-fluorophenyl)biguanide. |
| 3,4-diiodo-2-fluoroaniline | 1-(3,4-diiodo-2-fluorophenyl)biguanide. |
| 2-chloro-3-bromo-4-iodoaniline | 1-(2-chloro-3-bromo-4-iodophenyl)biguanide. |
| 2-chloro-3-iodo-4-bromoaniline | 1-(2-chloro-3-iodo-4-bromophenyl)biguanide. |
| 2-bromo-3-chloro-4-iodoaniline | 1-(2-bromo-3-chloro-4-iodophenyl)biguanide. |
| 2-bromo-3-iodo-4-chloroaniline | 1-(2-bromo-3-iodo-4-chlorophenyl)biguanide. |
| 2-iodo-3-chloro-4-bromoaniline | 1-(2-iodo-3-chloro-4-bromophenyl)biguanide. |
| 2-iodo-3-bromo-4-chloroaniline | 1-(2-iodo-3-bromo-4-chlorophenyl)biguanide. |
| 2-chloro-3-bromo-4-fluoroaniline | 1-(2-chloro-3-bromo-4-fluorophenyl)biguanide. |
| 2-chloro-3-fluoro-4-bromoaniline | 1-(2-chloro-3-fluoro-4-bromophenyl)biguanide. |
| 2-bromo-3-chloro-4-fluoroaniline | 1-(2-bromo-3-chloro-4-fluorophenyl)biguanide. |
| 2-bromo-3-fluoro-4-chloroaniline | 1-(2-bromo-3-fluoro-4-fluorophenyl)biguanide. |
| 2-fluoro-3-chloro-4-bromoaniline | 1-(2-fluoro-3-chloro-4-bromophenyl)biguanide. |
| 2-fluoro-3-bromo-4-chloroaniline | 1-(2-fluoro-3-bromo-4-chlorophenyl)biguanide. |
| 2-chloro-3-fluoro-4-iodoaniline | 1-(2-chloro-3-fluoro-4-iodophenyl)biguanide. |
| 2-chloro-3-iodo-4-fluoroaniline | 1-(2-chloro-3-iodo-4-fluorophenyl)biguanide. |
| 2-flouro-3-chloro-4-iodoaniline | 1-(2-fluoro-3-chloro-4-iodophenyl)biguanide. |
| 2-fluoro-3-iodo-4-chloroaniline | 1-(2-fluoro-3-iodo-4-chlorophenyl)biguanide. |
| 2-iodo-3-chloro-4-fluoroaniline | 1-(2-iodo-3-chloro-4-fluorophenyl)biguanide. |
| 2-iodo-3-fluoro-4-chloroaniline | 1-(2-iodo-3-fluoro-4-chlorophenyl)biguanide. |
| 2-bromo-3-fluoro-4-iodoaniline | 1-(2-bromo-3-fluoro-4-iodophenyl)biguanide. |
| 2-bromo-3-iodo-4-fluoroaniline | 1-(2-bromo-3-iodo-4-fluorophenyl)biguanide. |
| 2-fluoro-3-bromo-4-iodoaniline | 1-(2-fluoro-3-bromo-4-iodophenyl)biguanide. |
| 2-fluoro-3-iodo-4-bromoaniline | 1-(2-fluoro-3-iodo-4-bromophenyl)biguanide. |
| 2-iodo-3-bromo-4-fluoroaniline | 1-(2-iodo-3-bromo-4-fluorophenyl)biguanide. |
| 2-iodo-3-fluoro-4-bromoaniline | 1-(2-iodo-3-fluoro-4-bromophenyl)biguanide. |
| 2,3-dichloro-5-bromoaniline | 1-(2,3-dichloro-5-bromophenyl)biguanide. |
| 2,5-dichloro-3-bromoaniline | 1-(2,5-dichloro-3-bromophenyl)biguandie. |
| 3,5-dichloro-2-bromoaniline | 1-(3,5-dichloro-2-bromophenyl)biguanide. |
| 2,3-dibromo-5-chloroaniline | 1-(2,3-dibromo-5-chlorophenyl)biguanide. |
| 2,5-dibromo-3-chloroaniline | 1-(2,5-dibromo-3-chlorophenyl)biguanide. |
| 3,5-dibromo-2-chloroaniline | 1-(3,5-dibromo-2-chlorophenyl)biguanide. |
| 2,3-dichloro-5-fluoroaniline | 1-(2,3-dichloro-5-fluorophenyl)biguanide. |
| 2,5-dichloro-3-fluoroaniline | 1-(2,5-dichloro-3-fluorophenyl)biguanide. |
| 3,5-dichloro-2-fluoroaniline | 1-(3,5-dichloro-2-fluorophenyl)biguanide. |
| 2,3-difluoro-5-chloroaniline | 1-(2,3-difluoro-5-chlorophenyl)biguanide. |
| 2,5-difluoro-3-chloroaniline | 1-(2,5-difluoro-3-chlorophenyl)biguanide. |
| 3,5-difluoro-2-chloroaniline | 1-(3,5-difluoro-2-chlorophenyl)biguanide. |
| 2,3-dichloro-5-iodoaniline | 1-(2,3-dichloro-5-iodophenyl)biguanide. |
| 2,5-dichloro-3-iodoaniline | 1-(2,5-dichloro-3-iodophenyl)biguanide. |
| 3,5-dichloro-2-iodoaniline | 1-(3,5-dichloro-2-iodophenyl)biguanide. |
| 2,3-diiodo-5-chloroaniline | 1-(2,3-diiodo-5-chlorophenyl)biguanide. |
| 2,5-diiodo-3-chloroaniline | 1-(2,5-diiodo-3-chlorophenyl)biguanide. |
| 3,5-diiodo-2-chloroaniline | 1-(3,5-diiodo-2-chlorophenyl)biguanide. |
| 2,3-dibromo-5-fluoroaniline | 1-(2,3-dibromo-5-fluorophenyl)biguanide. |
| 2,5-dibromo-3-fluoroaniline | 1-(2,5-dibromo-3-fluorophenyl)biguanide. |

TABLE—Continued

| Starting Material | Product |
|---|---|
| 3,5-dibromo-2-fluoroaniline | 1-(3,5-dibromo-2-fluorophenyl)biguanide. |
| 2,3-difluoro-5-bromoaniline | 1-(2,3-difluoro-5-bromophenyl)biguanide. |
| 2,5-difluoro-3-bromoaniline | 1-(2,5-difluoro-3-bromophenyl)biguanide. |
| 3,5-difluoro-2-bromoaniline | 1-(3,5-difluoro-2-bromophenyl)biguanide. |
| 2,3-dibromo-5-iodoaniline | 1-(2,3-dibromo-5-iodophenyl)biguanide. |
| 2,5-dibromo-3-iodoaniline | 1-(2,5-dibromo-3-iodophenyl)biguanide. |
| 3,5-dibromo-2-iodoaniline | 1-(3,5-dibromo-2-iodophenyl)biguanide. |
| 2,3-diiodo-5-bromoaniline | 1-(2,3-diiodo-5-bromophenyl)biguanide. |
| 2,5-diiodo-3-bromoaniline | 1-(2,5-diiodo-3-bromophenyl)biguanide. |
| 3,5-diiodo-2-bromoaniline | 1-(3,5-diiodo-2-bromophenyl)biguanide. |
| 2,3-difluoro-5-iodoaniline | 1-(2,3-difluoro-5-iodophenyl)biguanide. |
| 2,5-difluoro-3-iodoaniline | 1-(2,5-difluoro-3-iodophenyl)biguanide. |
| 3,5-difluoro-2-iodoaniline | 1-(3,5-difluoro-2-iodophenyl)biguanide. |
| 2,3-diiodo-5-fluoroaniline | 1-(2,3-diiodo-5-fluorophenyl)biguanide. |
| 2,5-diiodo-3-fluoroaniline | 1-(2,5-diiodo-3-fluorophenyl)biguanide. |
| 3,5-diiodo-2-fluoroaniline | 1-(3,5-diiodo-2-fluorophenyl)biguanide. |
| 2-chloro-3-bromo-5-iodoaniline | 1-(2-chloro-3-bromo-5-iodophenyl)biguanide. |
| 2-chloro-3-iodo-5-bromoaniline | 1-(2-chloro-3-iodo-5-bromophenyl)biguanide. |
| 2-bromo-3-chloro-5-iodoaniline | 1-(2-bromo-3-chloro-5-iodophenyl)biguanide. |
| 2-bromo-3-iodo-5-chloroaniline | 1-(2-bromo-3-iodo-5-chlorophenyl)biguanide. |
| 2-iodo-3-chloro-5-bromoaniline | 1-(2-iodo-3-chloro-5-bromophenyl)biguanide. |
| 2-iodo-3-bromo-5-chloroaniline | 1-(2-iodo-3-bromo-5-chlorophenyl)biguanide. |
| 2-chloro-3-bromo-5-fluoroaniline | 1-(2-chloro-3-bromo-5-fluorophenyl)biguanide. |
| 2-chloro-3-fluoro-5-bromoaniline | 1-(2-chloro-3-fluoro-5-bromophenyl)biguanide. |
| 2-bromo-3-chloro-5-fluoroaniline | 1-(2-bromo-3-chloro-5-fluorophenyl)biguanide. |
| 2-bromo-3-fluoro-5-chloroaniline | 1-(2-bromo-3-fluoro-5-chlorophenyl)biguanide. |
| 2-fluoro-3-chloro-5-bromoaniline | 1-(2-fluoro-3-chloro-5-bromophenyl)biguanide. |
| 2-fluoro-3-bromo-5-chloroaniline | 1-(2-fluoro-3-bromo-5-chlorophenyl)biguanide. |
| 2-chloro-3-fluoro-5-iodoaniline | 1-(2-chloro-3-fluoro-5-iodophenyl)biguanide. |
| 2-chloro-3-iodo-5-fluoroaniline | 1-(2-chloro-3-iodo-5-fluorophenyl)biguanide. |
| 2-fluoro-3-chloro-5-iodoaniline | 1-(2-fluoro-3-chloro-5-iodophenyl)biguanide. |
| 2-fluoro-3-iodo-5-chloroaniline | 1-(2-fluoro-3-iodo-5-chlorophenyl)biguanide. |
| 2-iodo-3-chloro-5-fluoroaniline | 1-(2-iodo-3-chloro-5-fluorophenyl)biguanide. |
| 2-iodo-3-fluoro-5-chloroaniline | 1-(2-iodo-3-fluoro-5-chlorophenyl)biguanide. |
| 2-bromo-3-fluoro-5-iodoaniline | 1-(2-bromo-3-fluoro-5-iodophenyl)biguanide. |
| 2-bromo-3-iodo-5-fluoroaniline | 1-(2-bromo-3-iodo-5-fluorophenyl)biguanide. |
| 2-fluoro-3-bromo-5-iodoaniline | 1-(2-fluoro-3-bromo-5-iodophenyl)biguanide. |
| 2-fluoro-3-iodo-5-bromoaniline | 1-(2-fluoro-3-iodo-5-bromophenyl)biguanide. |
| 2-iodo-3-bromo-5-fluoroaniline | 1-(2-iodo-3-bromo-5-fluorophenyl)biguanide. |
| 2-iodo-3-fluoro-5-bromoaniline | 1-(2-iodo-3-fluoro-5-bromophenyl)biguanide. |
| 2,3-dichloro-6-bromoaniline | 1-(2,3-dichloro-6-bromophenyl)biguanide. |
| 2,6-dichloro-3-bromoaniline | 1-(2,6-dichloro-3-bromophenyl)biguanide. |
| 3,6-dichloro-2-bromoaniline | 1-(3,6-dichloro-2-bromophenyl)biguanide. |
| 2,3-dibromo-6-chloroaniline | 1-(2,3-dibromo-6-chlorophenyl)biguanide. |
| 2,6-dibromo-3-chloroaniline | 1-(2,6-dibromo-3-chlorophenyl)biguanide. |
| 3,6-dibromo-2-chloroaniline | 1-(3,6-dibromo-2-chlorophenyl)biguanide. |
| 2,3-dichloro-6-fluoroaniline | 1-(2,3-dichloro-6-fluorophenyl)biguanide. |
| 2,6-dichloro-3-fluoroaniline | 1-(2,6-dichloro-3-fluorophenyl)biguanide. |
| 3,6-dichloro-2-fluoroaniline | 1-(3,6-dichloro-2-fluorophenyl)biguanide. |
| 2,3-difluoro-6-chloroaniline | 1-(2,3-difluoro-6-chlorophenyl)biguanide. |
| 2,6-difluoro-3-chloroaniline | 1-(2,6-difluoro-3-chlorophenyl)biguanide. |
| 3,6-difluoro-2-chloroaniline | 1-(3,6-difluoro-2-chlorophenyl)biguanide. |
| 2,3-dichloro-6-iodoaniline | 1-(2,3-dichloro-6-iodophenyl)biguanide. |
| 2,6-dichloro-3-iodoaniline | 1-(2,6-dichloro-3-iodophenyl)biguanide. |
| 3,6-dichloro-2-iodoaniline | 1-(3,6-dichloro-2-iodophenyl)biguanide. |
| 2,3-diiodo-6-chloroaniline | 1-(2,3-diiodo-6-chlorophenyl)biguanide. |
| 2,6-diiodo-3-chloroaniline | 1-(2,6-diiodo-3-chlorophenyl)biguanide. |
| 3,6-diiodo-2-chloroaniline | 1-(3,6-diiodo-2-chlorophenyl)biguanide. |
| 2,3-dibromo-6-fluoroaniline | 1-(2,3-dibromo-6-fluorophenyl)biguanide. |
| 2,6-dibromo-3-fluoroaniline | 1-(2,6-dibromo-3-fluorophenyl)biguanide. |
| 3,6-dibromo-2-fluoroaniline | 1-(3,6-dibromo-2-fluorophenyl)biguanide. |
| 2,3-difluoro-6-bromoaniline | 1-(2,3-difluoro-6-bromophenyl)biguanide. |
| 3,6-difluoro-3-bromoaniline | 1-(2,6-difluoro-3-bromophenyl)biguanide. |
| 3,6-difluoro-2-bromoaniline | 1-(3,6-difluoro-2-bromophenyl)biguanide. |
| 2,3-dibromo-6-iodoaniline | 1-(2,3-dibromo-6-iodophenyl)biguanide. |
| 2,6-dibromo-3-iodoaniline | 1-(2,6-dibromo-3-iodophenyl)biguanide. |
| 3,6-dibromo-2-iodoaniline | 1-(3,6-dibromo-2-iodophenyl)biguanide. |
| 2,3-diiodo-6-bromoaniline | 1-(2,3-diiodo-6-bromophenyl)biguanide. |
| 2,6-diiodo-3-bromoaniline | 1-(2,6-diiodo-3-bromophenyl)biguanide. |
| 3,6-diiodo-2-bromoaniline | 1-(3,6-diiodo-2-bromophenyl)biguanide. |
| 2,3-difluoro-6-iodoaniline | 1-(2,3-difluoro-6-iodophenyl)biguanide. |
| 2,6-difluoro-3-iodoaniline | 1-(2,6-difluoro-3-iodophenyl)biguanide. |
| 3,6-difluoro-2-iodoaniline | 1-(3,6-difluoro-2-iodophenyl)biguanide. |
| 2,3-diiodo-6-fluoroaniline | 1-(2,3-diiodo-6-fluorophenyl)biguanide. |
| 2,6-diiodo-3-fluoroaniline | 1-(2,6-diiodo-3-fluorophenyl)biguanide. |
| 3,6-diiodo-2-fluoroaniline | 1-(3,6-diiodo-2-fluorophenyl)biguanide. |
| 2-chloro-3-bromo-6-iodoaniline | 1-(2-chloro-3-bromo-6-iodophenyl)biguanide. |
| 2-chloro-3-iodo-6-bromoaniline | 1-(2-chloro-3-iodo-6-bromophenyl)biguanide. |
| 2-bromo-3-chloro-6-iodoaniline | 1-(2-bromo-3-chloro-6-iodophenyl)biguanide. |
| 2-bromo-3-iodo-6-chloroaniline | 1-(2-bromo-3-iodo-6-chlorophenyl)biguanide. |
| 2-iodo-3-chloro-6-bromoaniline | 1-(2-iodo-3-chloro-6-bromophenyl)biguanide. |
| 2-iodo-3-bromo-6-chloroaniline | 1-(2-iodo-3-bromo-6-chlorophenyl)biguanide. |
| 2-chloro-3-bromo-6-fluoroaniline | 1-(2-chloro-3-bromo-6-fluorophenyl)biguanide. |
| 2-chloro-3-fluoro-6-bromoaniline | 1-(2-chloro-3-fluoro-6-bromophenyl)biguanide. |
| 2-bromo-3-chloro-6-fluoroaniline | 1-(2-bromo-3-chloro-6-fluorophenyl)biguanide. |
| 2-bromo-3-fluoro-6-chloroaniline | 1-(2-bromo-3-fluoro-6-chlorophenyl)biguanide. |
| 2-fluoro-3-chloro-6-bromoaniline | 1-(2-fluoro-3-chloro-6-bromophenyl)biguanide. |
| 2-fluoro-3-bromo-6-chloroaniline | 1-(2-fluoro-3-bromo-6-chlorophenyl)biguanide. |
| 2-chloro-3-fluoro-6-iodoaniline | 1-(2-chloro-3-fluoro-6-iodophenyl)biguanide. |
| 2-chloro-3-iodo-6-fluoroaniline | 1-(2-chloro-3-iodo-6-fluorophenyl)biguanide. |
| 2-fluoro-3-chloro-6-iodoaniline | 1-(2-fluoro-3-chloro-6-iodophenyl)biguanide. |
| 2-fluoro-3-iodo-6-chloroaniline | 1-(2-fluoro-3-iodo-6-chlorophenyl)biguanide. |
| 2-iodo-3-chloro-6-fluoroaniline | 1-(2-iodo-3-chloro-6-fluorophenyl)biguanide. |
| 2-iodo-3-fluoro-6-chloroaniline | 1-(2-iodo-3-fluoro-6-chlorophenyl)biguanide. |
| 2-bromo-3-fluoro-6-iodoaniline | 1-(2-bromo-3-fluoro-6-iodophenyl)biguanide. |
| 2-bromo-3-iodo-6-fluoroaniline | 1-(2-bromo-3-iodo-6-fluorophenyl)biguanide. |
| 2-fluoro-3-bromo-6-iodoaniline | 1-(2-fluoro-3-bromo-6-iodophenyl)biguanide. |
| 2-fluoro-3-iodo-6-bromoaniline | 1-(2-fluoro-3-iodo-6-bromophenyl)biguanide. |
| 2-iodo-3-bromo-6-fluoroaniline | 1-(2-iodo-3-bromo-6-fluorophenyl)biguanide. |
| 2-iodo-3-fluoro-6-bromoaniline | 1-(2-iodo-3-fluoro-6-bromophenyl)biguanide. |
| 2,4-dichloro-6-bromoaniline | 1-(2,4-dichloro-6-bromophenyl)biguanide. |
| 2,6-dichloro-4-bromoaniline | 1-(2,6-dichloro-4-bromophenyl)biguanide. |
| 2,4-dichloro-6-iodoaniline | 1-(2,4-dichloro-6-iodophenyl)biguanide. |
| 2,6-dichloro-4-iodoaniline | 1-(2,6-dichloro-4-iodophenyl)biguanide. |
| 2,4-dichloro-6-fluoroaniline | 1-(2,4-dichloro-6-fluorophenyl)biguanide. |
| 2-chloro-4-fluoro-6-iodoaniline | 1-(2-chloro-4-fluoro-6-iodophenyl)biguanide. |
| 2,4-dibromo-6-chloroaniline | 1-(2,4-dibromo-6-chlorophenyl)biguanide. |
| 2,6-dibromo-4-chloroaniline | 1-(2,6-dibromo-4-chlorophenyl)biguanide. |

TABLE—Continued

| Starting Material | Product |
|---|---|
| 2,4-dibromo-6-iodoaniline | 1-(2,4-dibromo-6-iodophenyl)-biguanide. |
| 2,6-dibromo-4-iodoaniline | 1-(2,6-dibromo-4-iodophenyl)-biguanide. |
| 2,4-dibromo-6-fluoroaniline | 1-(2,4-dibromo-6-fluorophenyl)-biguanide. |
| 2,6-dibromo-4-fluoroaniline | 1-(2,6-dibromo-4-fluorophenyl)-biguanide. |
| 2,4-diiodo-6-chloroaniline | 1-(2,4-diiodo-6-chlorophenyl)-biguanide. |
| 2,6-diiodo-4-chloroaniline | 1-(2,6-diiodo-4-chlorophenyl)-biguanide. |
| 2,4-diiodo-6-bromoaniline | 1-(2,4-diiodo-6-bromophenyl)-biguanide. |
| 2,6-diiodo-4-bromoaniline | 1-(2,6-diiodo-4-bromophenyl)-biguanide. |
| 2,4-diiodo-6-fluoroaniline | 1-(2,4-diiodo-6-fluorophenyl)-biguanide. |
| 2,6-diiodo-4-fluoroaniline | 1-(2,6-diiodo-4-fluorophenyl)-biguanide. |
| 2,4-difluoro-6-chloroaniline | 1-(2,4-difluoro-6-chlorophenyl)-biguanide. |
| 2,6-difluoro-4-chloroaniline | 1-(2,6-difluoro-4-chlorophenyl)-biguanide. |
| 2,4-difluoro-6-bromoaniline | 1-(2,4-difluoro-6-bromophenyl)-biguanide. |
| 2,6-difluoro-4-bromoaniline | 1-(2,6-difluoro-4-bromophenyl)-biguanide. |
| 2,4-difluoro-6-iodoaniline | 1-(2,4-difluoro-6-iodophenyl)-biguanide. |
| 2,6-difluoro-4-iodoaniline | 1-(2,6-difluoro-4-iodophenyl)-biguanide. |
| 2-chloro-4-bromo-6-iodoaniline | 1-(2-chloro-4-bromo-6-iodophenyl)-biguanide. |
| 2-chloro-4-iodo-6-bromoaniline | 1-(2-chloro-4-iodo-6-bromophenyl)-biguanide. |
| 2-chloro-4-bromo-6-fluoroaniline | 1-(2-chloro-4-bromo-6-fluorophenyl)-biguanide. |
| 2-chloro-4-fluoro-6-bromoaniline | 1-(2-chloro-4-fluoro-6-bromophenyl)-biguanide. |
| 2-chloro-4-iodo-6-fluoroaniline | 1-(2-chloro-4-iodo-6-fluorophenyl)-biguanide. |
| 2-chloro-4-fluoro-6-iodoaniline | 1-(2-chloro-4-fluoro-6-iodophenyl)-biguanide. |
| 2-bromo-4-chloro-6-fluoroaniline | 1-(2-bromo-4-chloro-6-fluorophenyl)-biguanide. |
| 2-bromo-4-chloro-6-iodoaniline | 1-(2-bromo-4-chloro-6-iodophenyl)-biguanide. |
| 2-bromo-4-iodo-6-fluoroaniline | 1-(2-bromo-4-iodo-6-fluorophenyl)-biguanide. |
| 2-bromo-4-fluoro-6-iodoaniline | 1-(2-bromo-4-fluoro-6-iodophenyl)-biguanide. |
| 2-iodo-4-chloro-6-fluoroaniline | 1-(2-iodo-4-chloro-6-fluorophenyl)-biguanide. |
| 2-iodo-4-bromo-6-fluoroaniline | 1-(2-iodo-4-bromo-6-fluorophenyl)-biguanide. |
| 3,4-dichloro-5-bromoaniline | 1-(3,4-dichloro-5-bromophenyl)-biguanide. |
| 3,5-dichloro-4-bromoaniline | 1-(3,5-dichloro-4-bromophenyl)-biguanide. |
| 3,4-dichloro-5-iodoaniline | 1-(3,4-dichloro-5-iodophenyl)-biguanide. |
| 3,5-dichloro-4-iodoaniline | 1-(3,5-dichloro-4-iodophenyl)-biguanide. |
| 3,4-dichloro-5-fluoroaniline | 1-(3,4-dichloro-5-fluorophenyl)-biguanide. |
| 3-chloro-4-fluoro-5-iodoaniline | 1-(3-chloro-4-fluoro-5-iodophenyl)-biguanide. |
| 3,4-dibromo-5-chloroaniline | 1-(3,4-dibromo-5-chlorophenyl)-biguanide. |
| 3,5-dibromo-4-chloroaniline | 1-(3,5-dibromo-4-chlorophenyl)-biguanide. |
| 3,4-dibromo-5-iodoaniline | 1-(3,4-dibromo-5-iodophenyl)-biguanide. |
| 3,5-dibromo-4-iodoaniline | 1-(3,5-dibromo-4-iodophenyl)-biguanide. |
| 3,4-dibromo-5-fluoroaniline | 1-(3,4-dibromo-5-fluorophenyl)-biguanide. |
| 3,5-dibromo-4-fluoroaniline | 1-(3,5-dibromo-4-fluorophenyl)-biguanide. |
| 3,4-diiodo-5-chloroaniline | 1-(3,4-diiodo-5-chlorophenyl)biguanide. |
| 3,5-diiodo-4-chloroaniline | 1-(3,5-diiodo-4-chlorophenyl)biguanide. |
| 3,4-diiodo-5-bromoaniline | 1-(3,4-diiodo-5-bromophenyl)biguanide. |
| 3,5-diiodo-4-bromoaniline | 1-(3,5-diiodo-4-bromophenyl)biguanide. |
| 3,4-diiodo-5-fluoroaniline | 1-(3,4-diiodo-5-fluorophenyl)biguanide. |
| 3,5-diiodo-4-fluoroaniline | 1-(3,5-diiodo-4-fluorophenyl)biguanide. |
| 3,4-difluoro-5-chloroaniline | 1-(3,4-difluoro-5-chlorophenyl)biguanide. |
| 3,5-difluoro-4-chloroaniline | 1-(3,5-difluoro-4-chlorophenyl)biguanide. |
| 3,4-difluoro-5-bromoaniline | 1-(3,4-difluoro-5-bromophenyl)biguanide. |
| 3,5-difluoro-4-bromoaniline | 1-(3,5-difluoro-4-bromophenyl)biguanide. |
| 3,4-difluoro-5-iodoaniline | 1-(3,4-difluoro-5-iodophenyl)biguanide. |
| 3,5-difluoro-4-iodoaniline | 1-(3,5-difluoro-4-iodophenyl)biguanide. |
| 3-chloro-4-bromo-5-iodoaniline | 1-(3-chloro-4-bromo-5-iodophenyl)biguanide. |
| 3-chloro-4-iodo-5-bromoaniline | 1-(3-chloro-4-iodo-5-bromophenyl)biguanide. |
| 3-chloro-4-bromo-5-fluoroaniline | 1-(3-chloro-4-bromo-5-fluorophenyl)biguanide. |
| 3-chloro-4-fluoro-5-bromoaniline | 1-(3-chloro-4-fluoro-5-bromophenyl)biguanide. |
| 3-chloro-4-iodo-5-fluoroaniline | 1-(3-chloro-4-iodo-5-fluorophenyl)biguanide. |
| 3-chloro-4-fluoro-5-iodoaniline | 1-(3-chloro-4-fluoro-5-iodophenyl)biguanide. |
| 3-bromo-4-chloro-5-fluoroaniline | 1-(3-bromo-4-chloro-5-fluorophenyl)biguanide. |
| 3-bromo-4-chloro-5-iodoaniline | 1-(3-bromo-4-chloro-5-iodophenyl)biguanide. |
| 3-bromo-4-iodo-5-fluoroaniline | 1-(3-bromo-4-iodo-5-fluorophenyl)biguanide. |
| 3-bromo-4-fluoro-5-iodoaniline | 1-(3-bromo-4-fluoro-5-iodophenyl)biguanide. |
| 3-iodo-4-chloro-5-fluoroaniline | 1-(3-iodo-4-chloro-5-fluorophenyl)biguanide. |
| 3-iodo-4-bromo-5-fluoroaniline | 1-(3-iodo-4-bromo-5-fluorophenyl)biguanide. |

We claim:

1. A method for the treatment of gastrointestinal spasms which comprises the oral or parenteral administration to a patient suffering from gastronintestinal spasms of between 0.05 mg./kg. and 70 mg./kg. per day of a compound of the formula:

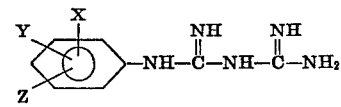

where
X, Y and Z may be at any position on the ring;
X and Y are fluoro, chloro, bromo or iodo; and
Z is hydrogen, fluoro, chloro, bromo or iodo;
or a non-toxic acid addition salt thereof.

2. The method of Claim 1 wherein the amount administered is 2–25 mg./kg./day.

3. The method of Claim 2 in which the compound administered is 1-(2,4-dichlorophenyl)biguanide.

4. The method of Claim 2 in which the compound administered is 1-(2-chloro-4-bromophenyl)biguanide.

5. The method of Claim 2 in which the compound administered is 1-(2-bromo-4-chlorophenyl)biguanide.

6. The method of Claim 2 in which the compound administered is 1-(4-dibromophenyl)biguanide.

7. The method of Claim 2 in which the compound administered is 1-(2-bromo-4-iodophenyl)biguanide.

8. The method of Claim 2 in which the compound administered is 1-(2-iodo-4-bromophenyl)biguanide.

9. The method of Claim 2 in which the compound administered is 1-(2-chloro-4-iodophenyl)biguanide.

10. The method of Claim 2 in which the compound administered is 1-(2-iodo-4-chlorophenyl)biguanide.

11. The method of Claim 2 in which the compound administered is 1-(2,6-dichlorophenyl)biguanide.

12. The method of Claim 2 in which the compound administered is 1-(2,6-dibromophenyl)biguanide.

13. The method of Claim 2 in which the compound administered is 1-(2-chloro-6-bromophenyl)biguanide.

14. The method of Claim 2 in which the compound administered is 1-(2,4-dichloro-6-bromophenyl)biguanide.

15. The method of Claim 2 in which the compound administered is 1-(2,6-dichloro-4-bromophenyl)biguanide.

16. The method of Claim 2 in which the compound administered is 1-(2,4-dibromo-6-chlorophenyl)biguanide.

17. The method of Claim 2 in which the compound administered is 1-(2,6-dibromo-4-chlorophenyl)biguanide.

18. The method of Claim 2 in which the compound administered is 1-(2,6-dichloro-4-iodophenyl)biguanide.

19. The method of Claim 2 in which the compound administered is 1-(2-bromo-4-iodo-6-chlorophenyl) biguanide.

20. The method of Claim 2 in which the compound administered is 1-(2-chloro-4-bromo-6-fluorophenyl) biguanide.

21. The method of Claim 2 in which the compound administered is 1-(2-bromo-4-chloro-6-fluorophenyl) biguanide.

References Cited

UNITED STATES PATENTS

| | | | |
|---|---|---|---|
| 2,544,827 | 3/1951 | Curd | 260—565 |
| 2,961,377 | 11/1960 | Shapiro et al. | 424—326 |
| 3,639,535 | 2/1972 | Kuehn | 260—932 |

ALBERT T. MEYERS, Primary Examiner

F. E. WADDELL, Assistant Examiner